United States Patent
Lu et al.

(10) Patent No.: US 12,155,044 B2
(45) Date of Patent: Nov. 26, 2024

(54) BATTERY PACK, METHOD FOR CONTROLLING A BATTERY PACK, AND VEHICLE

(71) Applicant: BYD COMPANY LIMITED, Shenzhen (CN)

(72) Inventors: Peng Lu, Shenzhen (CN); Qingbo Peng, Shenzhen (CN); Weixin Zheng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/310,782

(22) Filed: May 2, 2023

(65) Prior Publication Data
US 2023/0268560 A1    Aug. 24, 2023

Related U.S. Application Data

(63) Continuation of application No. PCT/CN2021/092423, filed on May 8, 2021.

(30) Foreign Application Priority Data

Dec. 23, 2020   (CN) .......................... 202011541853.8

(51) Int. Cl.
*H01M 10/42*   (2006.01)
*H01M 10/44*   (2006.01)
*H01M 10/46*   (2006.01)

(52) U.S. Cl.
CPC ....... *H01M 10/4228* (2013.01); *H01M 10/44* (2013.01); *H01M 10/46* (2013.01)

(58) Field of Classification Search
CPC .. H01M 10/42; H01M 10/4228; H01M 10/44; H01M 10/46
See application file for complete search history.

(56) References Cited

FOREIGN PATENT DOCUMENTS

| | | |
|---|---|---|
| CN | 202983627 U | 6/2013 |
| CN | 204188345 U | 3/2015 |
| CN | 106532146 A | 3/2017 |
| CN | 107221720 A | 9/2017 |
| CN | 107959066 A | 4/2018 |
| CN | 210516923 U | 5/2020 |
| JP | H1012284 A | 1/1998 |

(Continued)

OTHER PUBLICATIONS

The World Intellectual Property Organization (WIPO) International Search Report for PCT/CN2021/092423 Sep. 24, 2021 5 Pages.

*Primary Examiner* — Robert L Deberadinis
(74) *Attorney, Agent, or Firm* — Wenye Tan

(57) ABSTRACT

A battery pack includes a controller, a battery core, a liquid leakage detector, and a pre-charge switch. The liquid leakage detector is connected with the controller, and the liquid leakage detector is configured to send a liquid leakage signal to the controller when detecting that liquid leakage occurs in the battery core. The controller is configured to prohibit sending a pre-charge on signal to the pre-charge switch upon receiving the liquid leakage signal while receiving a start signal for starting the battery core. The pre-charge switch is configured to prohibit connection of the pre-charge voltage end and the power output end when not receiving the pre-charge on signal, to prohibit the battery core from outputting a pre-charge voltage through the power output end.

12 Claims, 3 Drawing Sheets

(56) References Cited

FOREIGN PATENT DOCUMENTS

| | | | |
|---|---|---|---|
| JP | 2001135363 | A | 5/2001 |
| JP | 2002359010 | A | 12/2002 |
| JP | 2017065284 | A | 4/2017 |
| JP | 2019109990 | A | 7/2019 |

BATTERY PACK, METHOD FOR CONTROLLING A BATTERY PACK, AND VEHICLE

CROSS-REFERENCE TO RELATED APPLICATIONS

The present application is a continuation application of PCT application No. PCT/CN2021/092423 filed on May 8, 2021, which claims priority to and benefits of Chinese Patent Application No. 202011541853.8, filed on Dec. 23, 2020. The entire content of all of the above-referenced application is incorporated herein by reference.

FIELD

The present disclosure relates to the field of electronic technologies, and specifically to a battery pack, a method for controlling a battery pack, and a vehicle.

BACKGROUND

With the development of battery technologies, new energy vehicles have entered people's daily life and become one of the main means of transportation. Battery pack is the power source of new energy vehicles, and the running status of the battery pack determines whether new energy vehicles can run safely and stably.

A battery pack includes a battery core. When a fault occurs, the electrolyte overflows from the battery core, affecting the safe operation of the battery pack. In order to prevent the battery pack from running in a liquid leakage state, a liquid leakage detection device is usually arranged outside the battery pack. When detecting that liquid leakage occurs in the battery pack, the liquid leakage detection device sends out a liquid leakage alarm signal to remind the user to turn off the running battery pack, so as to prevent the battery pack from running in the liquid leakage state and affect the safety of new energy vehicles.

In the related art, the liquid leakage detection device can only detect the liquid leakage status and cannot control the battery pack when liquid leakage occurs. As a result, the battery pack continues to operate in the liquid leakage state.

SUMMARY

According to a first aspect, an embodiment of the present disclosure provides a battery pack, including: a controller, a battery core, a liquid leakage detector, and a pre-charge switch, the liquid leakage detector is connected with the controller, and the liquid leakage detector is configured to send a liquid leakage signal to the controller when detecting that liquid leakage occurs in the battery core; the controller is connected with the pre-charge switch, and the controller is configured to prohibit sending a pre-charge on signal to the pre-charge switch upon receiving the liquid leakage signal while receiving a start signal for starting the battery core; one end of the pre-charge switch is connected with a pre-charge voltage end of the battery core, and another end of the pre-charge switch is connected with a power output end of the battery pack; and the pre-charge switch is configured to prohibit connection of the pre-charge voltage end and the power output end when not receiving the pre-charge on signal, to prohibit the battery core from outputting a pre-charge voltage through the power output end.

According to a second aspect, an embodiment of the present disclosure provides a method for controlling a battery pack, and the battery pack includes a controller, a battery core, a liquid leakage detector, and a pre-charge switch, the liquid leakage detector is connected with the controller, the controller is connected with the pre-charge switch, one end of the pre-charge switch is connected with a pre-charge voltage end of the battery core, and another end of the pre-charge switch is connected with a power output end of the battery pack; and the method is applied to the controller and includes: receiving a start signal for starting the battery core; and if a liquid leakage signal of the battery core sent by the liquid leakage detector is received, prohibiting sending a pre-charge on signal to the pre-charge switch, and when not receiving the pre-charge on signal, the pre-charge switch prohibits connection of the pre-charge voltage end of the battery core and the power output end of the battery pack, to prohibit the battery core from outputting a pre-charge voltage through the power output end.

In an embodiment of the present disclosure, the battery pack includes a controller, a battery core, a liquid leakage detector, and a pre-charge switch. The liquid leakage detector is connected with the controller, and the liquid leakage detector is configured to send a liquid leakage signal to the controller when detecting that liquid leakage occurs in the battery core. The controller is configured to prohibit sending a pre-charge on signal to the pre-charge switch upon receiving the liquid leakage signal while receiving a start signal for starting the battery core. The pre-charge switch is configured to prohibit connection of the pre-charge voltage end and the power output end when not receiving the pre-charge on signal, to prohibit the battery core from outputting a pre-charge voltage through the power output end. In a power-on start-up stage, if receiving the liquid leakage signal, the controller may control the battery core not to output the pre-charge voltage.

DETAILED DESCRIPTION

The technical solutions in the embodiments of the present disclosure are described in the following with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the specification and claims of the present disclosure, the terms "first", "second" or the like are intended to distinguish between similar objects but do not indicate a particular order or sequence. It is to be understood that the data termed in such a way are interchangeable in appropriate circumstances, and the embodiments of the present disclosure can be implemented in orders other than the order illustrated or described herein. In addition, "and/or" in the specification and claims indicates at least one of the associated objects. The character "/" generally indicates an "or" relation between the associated objects.

An objective of embodiments of the present disclosure is to provide a battery pack, a method for controlling a battery pack, and a vehicle, which can solve the problem that the liquid leakage detection device in the related art can only detect the liquid leakage status and cannot control the battery pack when liquid leakage occurs.

The battery pack provided in an embodiment of the present disclosure will be described in detail with reference to the accompanying drawings through specific embodiments and application scenarios.

Figure 1:
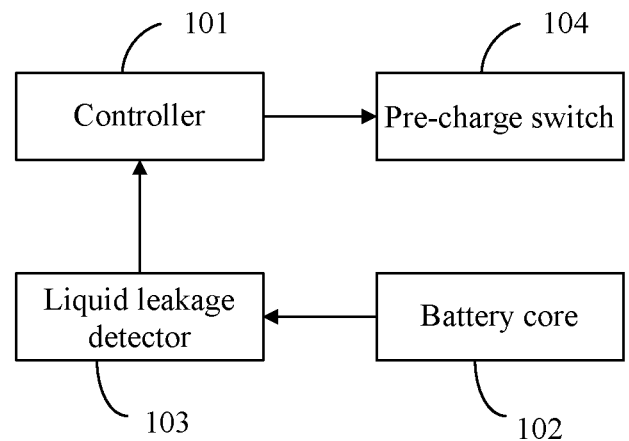
FIG. 1 is a schematic structural diagram of a battery pack according to an example embodiment.

FIG. 1 is a schematic structural diagram of a battery pack according to an example embodiment. As shown in FIG. 1, the battery pack includes a controller 101, a battery core 102, a liquid leakage detector 103, and a pre-charge switch 104.

The liquid leakage detector is connected with the controller, and the liquid leakage detector is configured to send a liquid leakage signal to the controller when detecting that liquid leakage occurs in the battery core.

Figure 2:
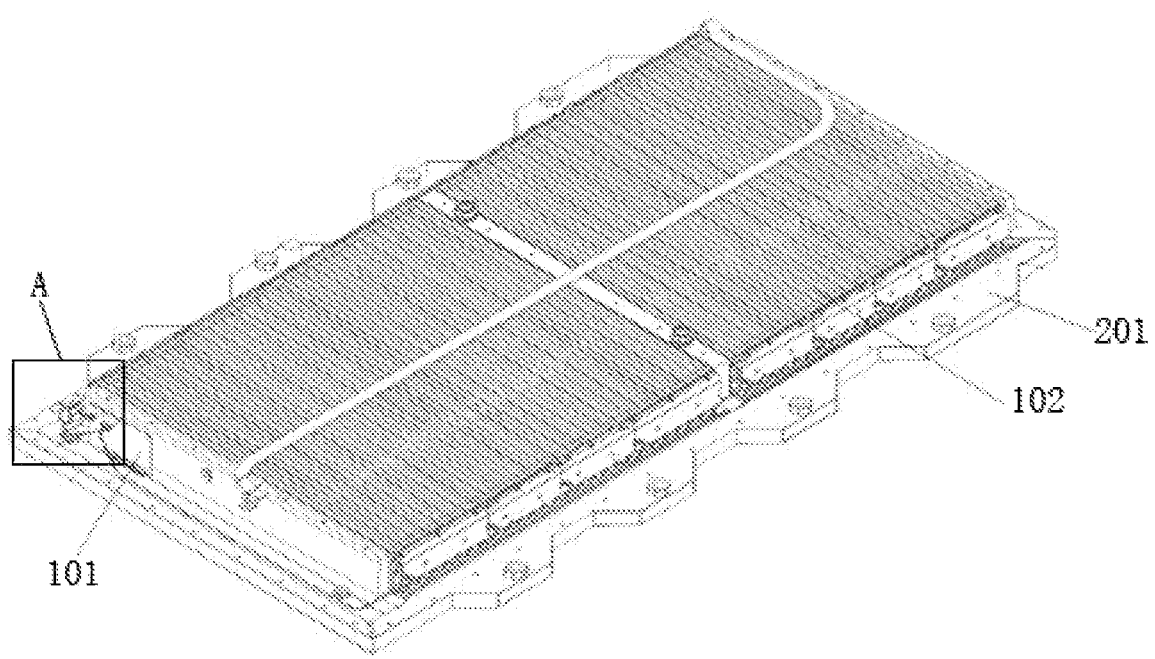
FIG. 2 is a schematic structural diagram of hardware of a battery pack according to an example embodiment.

In one embodiment, the liquid leakage detector 103 is configured to detect a liquid leakage status of the battery core 102 to obtain a liquid leakage signal that can characterize liquid leakage in the battery core 102, and send the liquid leakage signal to the controller 101. FIG. 2 is a schematic structural diagram of hardware of a battery pack according to an example embodiment. A tray 201 may be arranged at the bottom of the battery pack, and a plurality of battery cores 102 are arranged on the tray. The plurality of battery cores 102 may be connected in series in sequence to form a power supply section of the battery pack. The number of battery cores in the battery pack may be set according to actual requirements, and is not limited.

Optionally, the liquid leakage detector includes a liquid leakage detection strip, and the liquid leakage detection strip includes a signal output wire and a signal input wire; one end of the signal output wire is connected with the controller, and another end of the signal output wire is unconnected; one end of the signal input wire is connected with the controller, and another end of the signal input wire is unconnected;

the signal output wire is configured to connect to the signal input wire when liquid leakage occurs in the battery core, to transmit a detection signal sent by the controller to the signal input wire; the signal input wire is configured to transmit the detection signal as the liquid leakage signal to the controller when receiving the detection signal; and the signal output wire is further configured to disconnect from the signal input wire when no liquid leakage occurs in the battery core, to prohibit the signal input wire from transmitting the detection signal to the controller as the liquid leakage signal.

Figure 3:
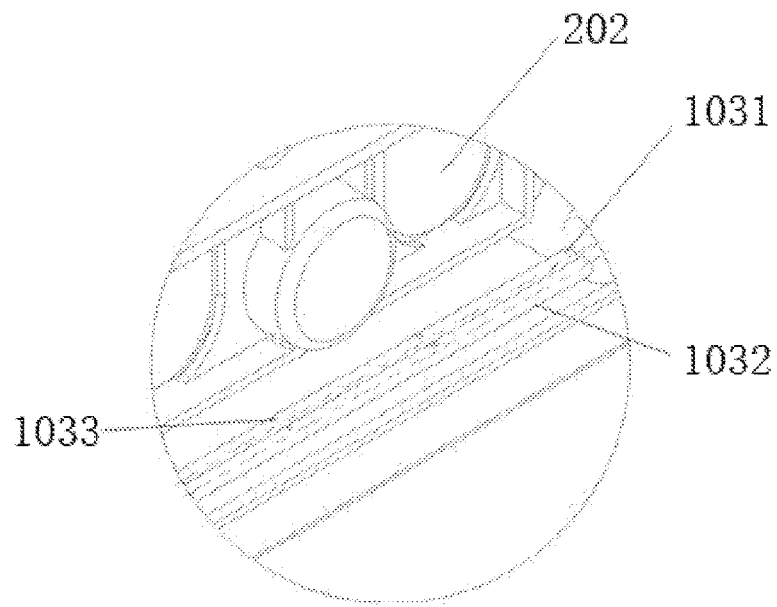
FIG. 3 is a partially enlarged schematic view of part A in FIG. 2.

In an embodiment, the liquid leakage detector 103 may include a liquid leakage detection strip, and the liquid leakage detection strip is disposed at a preset position in the battery pack to detect the liquid leakage status of the battery core. FIG. 3 is a partially enlarged schematic view of part A in FIG. 2, the liquid leakage detection strip includes a signal output wire 1031 and a signal input wire 1032. One end of the signal output wire is connected with a signal output end of the controller, and another end of the signal output wire is unconnected. One end of the signal input wire is connected with a signal input end of the controller 101, and another end of the signal input wire is unconnected. The signal output wire includes an insulating layer and a metal wire located in the insulating layer. The signal input wire also includes an insulating layer and a metal wire located in the insulating layer. The insulating layer of the signal output wire and the insulating layer of the signal input wire are each provided with a plurality of holes 1033 arranged at intervals.

In the operation of the liquid leakage detection strip, the signal output end of the controller 101 may output a detection signal, such as a pulse signal of a preset frequency. If a liquid leaked from the battery core soaks the liquid leakage detection strip, the liquid may enter the insulating layers through the holes on the insulating layers and contact with the metal wire in the signal output wire 1031 and the metal wire in the signal input wire 1032. In this case, the signal output wire 1031 and the signal input wire 1032 are short-circuited by the liquid, the detection signal output from the signal output end is transmitted from the signal output wire 1031 to the signal input wire 1032, and the signal input wire 1032 transmits the detection signal to the signal input end of the controller 101 as the liquid leakage signal. On the contrary, when no liquid leakage occurs in the battery core, the signal output wire 1031 and the signal input wire 1032 are disconnected. Because the detection signal cannot be transmitted to the controller, the controller cannot receive the liquid leakage signal. The detection signal may also be a constant voltage signal. The specific type of the detection signal may be set as required.

In practical applications, the liquid leakage detector adopts the form of liquid leakage detection strip, and the liquid leakage detector can be conveniently arranged at the preset position in the battery pack. Moreover, the detection range of the liquid leakage detector may be increased by increasing the length of the liquid leakage detection strip.

In an embodiment, the liquid leakage detection strip may be arranged at a position where electrolyte solution leakage is likely to occur in the battery pack, for example, at a cooling pipe joint, a housing weld joint, or a cell anti-explosion valve in the battery pack.

Optionally, the battery pack may further include an anti-explosion valve, and the liquid leakage detector is arranged at a detection position of the anti-explosion valve.

As shown in FIG. 3, the battery pack may include a cell anti-explosion valve 202. The liquid leakage detection strip may be disposed at the bottom of the cell anti-explosion valve, i.e. at the detection position of the anti-explosion valve. The liquid leakage detection strip may be tightly attached to a surface of the tray 201. The specific position of the detection position in the battery pack may be set as required, and is not limited.

In practical applications, because of the high risk of electrolyte solution leakage at the anti-explosion valve, the arrangement of the liquid leakage detector at the detection position of the cell anti-explosion valve can improve the timeliness and accuracy of liquid leakage detection.

Optionally, the battery pack may further include a housing, the battery core is located in the housing, and the detection module is arranged at a preset position in the housing.

As shown in FIG. 2, the battery pack may further include a housing. The housing is engaged with the tray 201, and devices such as the controller 101, the battery core 102, the liquid leakage detector 103, and the pre-charge switch 104 are all located in the sealed housing. The liquid leakage detection strip may be located at the preset position in the housing as shown in FIG. 2. When the liquid leakage detection strip is located in the housing, the liquid leakage status inside the housing can be detected in time, thereby improving the timeliness and accuracy of liquid leakage detection.

In an embodiment, a plurality of liquid leakage detection strips may be arranged in the battery pack according to a detection requirement. Based on the above example, a liquid leakage detection strip may be arranged at a cooling pipe joint in the battery pack to detect leakage of a coolant from a cooling pipe. In addition, a liquid leakage detection strip may also be arranged at an electrode of the battery core to detect leakage of an electrolyte solution at the electrode. Alternatively, a liquid leakage detection strip may be arranged at a weld joint between the housing and the tray to detect liquid leakage between the housing and the tray. In the arrangement of the liquid leakage detection strip, the liquid leakage detection strip may be tightly attached to the surface of the tray, and the leaked liquid can quickly immerse the liquid leakage detection strip. Alternatively, the liquid leakage detection strip may be arranged at a position where liquid deposition is likely to occur in the battery pack, and the leaked liquid can quickly connect the signal output wire and the signal input wire. The specific arrangement method and the arrangement position of the liquid leakage detection strip may be set as required, and is not limited in one embodiment.

It should be noted that the liquid leakage detector may include, but is not limited to, the liquid leakage detection strip as described above, and other types of liquid detection modules. The specific type of the liquid leakage detector is not limited. The battery pack may further include a cooling system, and the liquid leakage detector may also detect leakage of a liquid such as a coolant from the cooling system. In addition, for the liquid leakage detector, according to characteristics of the battery pack, one or more liquid leakage detectors may be arranged in the battery pack. The arrangement position and the number of the liquid leakage detectors are not limited.

The controller is connected with the pre-charge switch, and the controller is configured to prohibit sending a pre-charge on signal to the pre-charge switch upon receiving the liquid leakage signal while receiving a start signal for starting the battery core.

Figure 4:
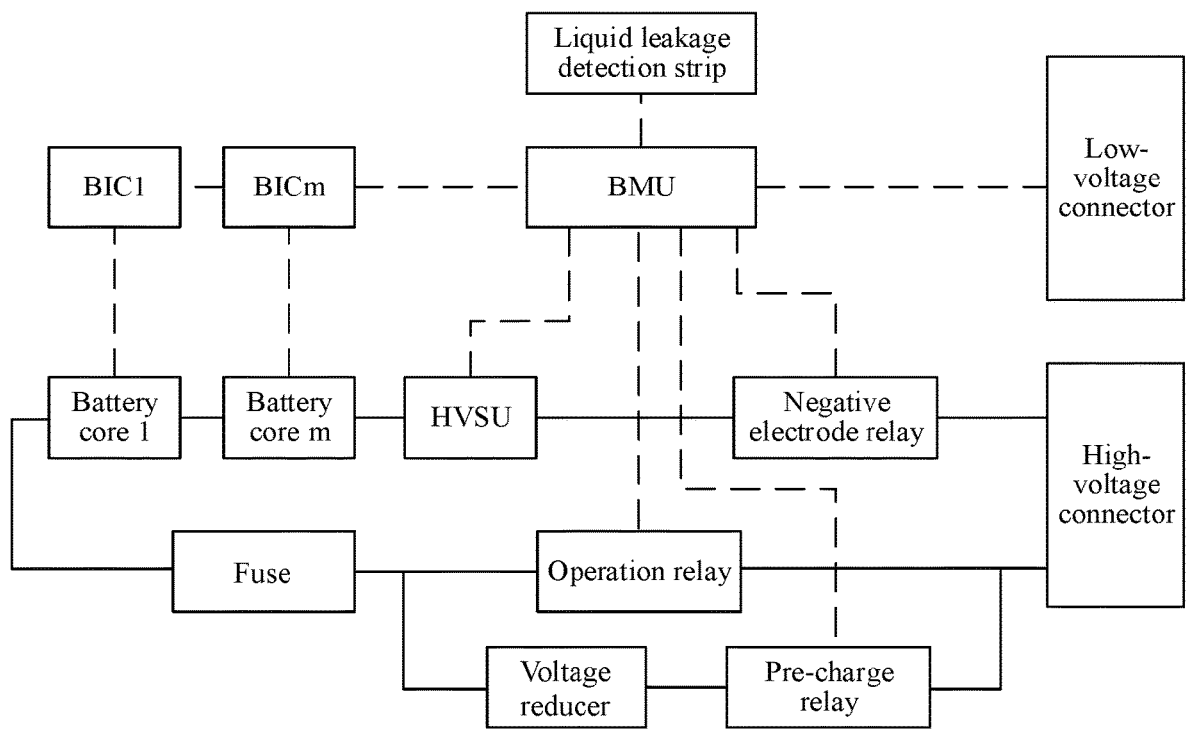
FIG. 4 is a schematic structural diagram of a battery management system according to an example embodiment.

In one embodiment, the controller 101 is configured to control charging and discharging of the battery pack. For example, the controller 101 is a battery management unit (BMU) in a battery management system (BMS). The BMU is configured to monitor a status of the battery core in the battery pack and control the charging and discharging of the battery pack. FIG. 4 is a schematic structural diagram of a battery management system according to an example embodiment. The battery pack includes a plurality of battery cores. Each of the battery cores is equipped with a battery information collector (BIC). The BMU is respectively connected with each BIC. The BMU may collect information such as temperature, battery level and voltage of the battery cores through the BICs. The plurality of battery cores are connected in series to form a power supply section of the battery pack. A negative electrode of the power supply section is connected with the BMU through a high voltage sampling unit (HVSU). The BMU may collect voltage information of the entire power supply section through the HVSU.

The start signal is used for starting the battery pack. After being started, the battery pack may provide different voltages for a vehicle at different stages during the operation of the vehicle. For example, the BMU may be connected with a vehicle control unit (VCU) in the vehicle. The BMU may receive a start signal sent by the VCU. After receiving the start signal, the BMU may start the battery pack, and the battery pack controls the power supply section in the battery pack (i.e., the plurality of battery cores in the battery pack) to provide a pre-charge voltage for the vehicle at a starting stage of the vehicle, and controls the power supply section to provide an operating voltage for the vehicle at an operation stage of the vehicle. The pre-charge voltage is used for providing a low buffer voltage to a power consuming section in the vehicle at the starting stage, and the operating voltage is used for providing a high rated voltage to the power consuming section in the vehicle at the operation stage. The specific process of obtaining the start signal by the controller may be set as required, and is not limited.

In one embodiment, if receiving the liquid leakage signal while receiving the start signal, the controller prohibits sending the pre-charge on signal to the pre-charge switch for starting the battery core. to prohibit the power supply section from operating to provide the pre-charge voltage to the vehicle.

One end of the pre-charge switch is connected with a pre-charge voltage end of the battery core, and another end of the pre-charge switch is connected with a power output end of the battery pack. The pre-charge switch is configured to prohibit connection of the pre-charge voltage end and the power output end when not receiving the pre-charge on signal, to prohibit the battery core from outputting a pre-charge voltage through the power output end.

For example, as shown in FIG. 4, the battery pack may further be provided with a fuse and a voltage reducer. The voltage reducer may include a pre-charge resistor. The fuse may prevent the battery pack from overvoltage and overcurrent. The voltage reducer may lower an output voltage of the power supply section to obtain the pre-charge voltage. A high-voltage connector may further be arranged in the battery pack. The pre-charge switch may be a pre-charge relay. After the plurality of battery cores are connected in series to form the power supply section, a positive electrode of the power supply section is connected with an input end of the fuse, an output end of the fuse is connected with an input end of the voltage reducer, an output of the voltage reducer is connected with one end of the pre-charge relay, and another end of the pre-charge relay is connected with a positive electrode power supply terminal in the high-voltage connector. The fuse, the voltage reducer, the pre-charge relay, and the positive electrode power supply terminal constitute a pre-charge voltage output circuit. During the operation of the power supply section, the voltage reducer lowers the output voltage of the power supply section to obtain the pre-charge voltage at the output end of the voltage reducer, that is, the output end of the voltage reducer is the pre-charge voltage end. After the pre-charge relay is turned on, the pre-charge voltage may be transmitted to the positive electrode power supply terminal in the high-voltage connector, and the positive electrode power supply terminal constitutes the power output end of the battery pack.

In addition, the battery pack may further include a negative electrode relay, the negative electrode of the power supply section may be connected with one end of the negative electrode relay through the HVSU, and another end of the negative electrode relay is connected with a negative electrode power supply terminal in the high-voltage connector. After the negative electrode relay and the pre-charge relay are turned on, a positive electrode of the power supply section may be connected with the positive electrode power supply terminal, and the negative electrode of the power supply section may be connected with the negative electrode power supply terminal, and the power supply section outputs the pre-charge voltage through the power supply output end (positive electrode power supply terminal), and provides the pre-charge voltage to the vehicle through the positive electrode power supply terminal and the negative electrode power supply terminal, to pre-charge the vehicle.

Based on the above example, the pre-charge on signal may be an on signal of the pre-charge relay. When the pre-charge relay does not receive the pre-charge on signal sent by the BMU, the pre-charge relay is prohibited from being turned on. In this case, the pre-charge voltage end is disconnected from the power output end, the pre-charge voltage cannot be transmitted to the power output end, the vehicle cannot obtain the pre-charge voltage and cannot be started, and the battery core does not discharge to the outside and is in a stopped state.

It should be noted that the type of the pre-charge switch may include but is not limited to the pre-charge relay described above, and the specific configuration of the pre-charge voltage output circuit may be set as required, and is not limited.

To sum up, in one embodiment, the battery pack includes a controller, a battery core, a liquid leakage detector, and a pre-charge switch. The liquid leakage detector is connected with the controller, and the liquid leakage detector is configured to send a liquid leakage signal to the controller when detecting that liquid leakage occurs in the battery core. The controller is configured to prohibit sending a pre-charge on signal to the pre-charge switch upon receiving the liquid leakage signal while receiving a start signal for starting the battery core. The pre-charge switch is configured to prohibit connection of the pre-charge voltage end and the power output end when not receiving the pre-charge on signal, to prohibit the battery core from outputting a pre-charge voltage through the power output end. In a power-on start-up stage, if receiving the liquid leakage signal, the controller may control the battery core not to output the pre-charge voltage, to prevent the battery pack from being started in a liquid leakage state, thereby effectively protecting the battery pack.

Optionally, the controller is further configured to send the pre-charge on signal to the pre-charge switch if not receiving the liquid leakage signal while receiving the start signal; and the pre-charge switch is further configured to connect the pre-charge voltage end and the power output end when receiving the pre-charge on signal, causing the battery core to output the pre-charge voltage.

In an embodiment, the controller may send the pre-charge on signal to the pre-charge switch if not receiving the liquid leakage signal after receiving the start signal. Based on the above example, if not receiving the detection signal from the liquid leakage detection strip after receiving the start signal sent by the VCU, the BMU may determine that the BMU has not received the liquid leakage signal. In this case, the BMU may send the pre-charge on signal to the pre-charge relay, where the pre-charge on signal is the on signal of the pre-charge relay.

Correspondingly, the pre-charge relay may be turned on after receiving the pre-charge on signal, to connect the pre-charge voltage end and the power output end. In this case, the power supply section can output the pre-charge voltage through the power output end to provide the pre-charge voltage to the vehicle.

In practical applications, if not receiving the liquid leakage signal after receiving the start signal, the controller may control the battery core to output the pre-charge voltage, and provide the pre-charge voltage to the vehicle at the starting stage, and the vehicle can start running in a safe state.

Optionally, the battery pack may further include an operation switch, where one end of the operation switch is connected with an operating voltage end of the battery core, and another end of the operation switch is connected with the power output end; the controller is further configured to prohibit sending an operation on signal to the operation switch upon receiving the liquid leakage signal while receiving a pre-charge completion signal, where the pre-charge completion signal is used for causing the battery core to stop outputting the pre-charge voltage and output the operating voltage; and the operation switch is configured to prohibit connection of the operating voltage end and the power output end when not receiving the operation on signal, to prohibit the battery core from outputting the operating voltage through the power output end.

For example, as shown in FIG. 4, the operation switch may be an operation relay, the output end of the fuse may further be connected with one end of the operation relay, and another end of the operation relay is connected with the positive electrode power supply terminal. The fuse, the operation relay, and the positive electrode power supply terminal constitute an operating voltage output circuit. The output end of the fuse directly outputs the voltage of the power supply section, that is, the operating voltage, and the output end of the fuse is the operating voltage end. After pre-charging of the vehicle at the starting stage is completed, the vehicle may switch from the starting stage to the operation stage. In this case, the VCU may send the pre-charge completion signal to the BMU. After receiving the pre-charge completion signal, the BMU may send a pre-charge off signal to the pre-charge relay and the operation on signal to the operation relay. Correspondingly, the pre-charge relay is disconnected after receiving the pre-charge off signal, to disconnect the pre-charge voltage end from the power output end. In addition, the operation relay is turned on after receiving the operation on signal, to connect the operating voltage end and the power output end, causing the power supply section to output the operating voltage and to provide the operating voltage to the vehicle.

If receiving the liquid leakage signal after receiving the pre-charge completion signal sent by the VCU, the BMU may prohibit sending the operation on signal to the operation relay. Correspondingly, the operation relay is prohibited from being turned on before receiving the operation on signal, to avoid connecting the operating voltage end and the power output end, and prevent the battery core from outputting the operating voltage, thereby preventing the battery core from operating in a liquid leakage state.

It should be noted that the controller may directly receive the pre-charge completion signal sent by the VCU, or may actively detect a status of the vehicle to obtain the pre-charge completion signal. The method of acquiring the pre-charge completion signal may be set as required. The type of the operation switch may include but is not limited to the operation relay described above, and the specific configuration of the operating voltage output circuit may be set as required, and is not limited.

In practical applications, after receiving the pre-charge completion signal, the controller may prohibit the operation switch from connecting the operating voltage end and the power output end, to prohibit the battery core from outputting the operating voltage, thereby preventing the battery core from outputting the operating voltage in the liquid leakage state, and effectively protecting the battery core.

Optionally, the controller is further configured to send an operation off signal to the operation switch upon receiving the liquid leakage signal when operation stop permission is granted; and the operation switch is further configured to disconnect the operating voltage end from the power output end when receiving the operation off signal, to prohibit the battery core from outputting the operating voltage.

In one embodiment, the controller may stop the operation of the battery pack upon receiving the liquid leakage signal when operation stop permission is granted. Based on the above example, the BMU may send an operation off signal to the operation relay when the operation stop permission is granted, and the operation relay is disconnected after receiving the operation off signal, to disconnect the operating voltage end from the power output end, to prohibit the battery core from outputting the operating voltage. In this case, the vehicle does not receive the operating voltage and stops running.

In an embodiment, when determining that the vehicle is in a starting state and the vehicle is not in a traveling state, the VCU may send an authorization instruction to the BMU. After receiving the authorization instruction, the BMU has the operation stop permission. In this case, when receiving the liquid leakage signal, the BMU may send the operation off signal to the operation relay. On the contrary, the BMU does not have the operation stop permission before receiving the authorization instruction. In this case, the BMU does not send the operation off signal when receiving the liquid leakage signal.

In practical applications, when the controller has the operation stop permission, the controller may send the operation off signal upon receiving the liquid leakage signal, to prohibit the battery core from outputting the operating voltage, thereby preventing the battery core from continuing to operate in the liquid leakage state, and effectively protecting the battery core.

Optionally, the battery pack may further include a power supply, where the power supply is connected with the controller and is configured to provide an independent power supply for the controller.

In one embodiment, the controller may be powered by the independent power supply to prevent the controller from stopping operating when the battery pack fails. For example, as shown in FIG. 4, a low-voltage connector may further be arranged in the battery pack. The power supply may be a 12-volt storage battery or a 12-volt low-voltage power supply system. The power input end of BMU may be connected with a power output end of the storage battery through the low-voltage connector to provide an external independent power supply for the BMU. The specific type of the power module may be set as required, and is not limited.

In practical applications, because the power supply provides an independent power supply for the controller, the controller can still detect the liquid leakage status when the battery pack fails, thereby effectively protecting the battery pack.

In an embodiment, after receiving the liquid leakage signal, the controller may output an alarm signal. For example, an alarm module (such as a speaker) may be arranged in the battery pack. After receiving the liquid leakage signal, the controller may control the speaker to output an audible alarm signal to remind the user of liquid leakage.

Figure 5:
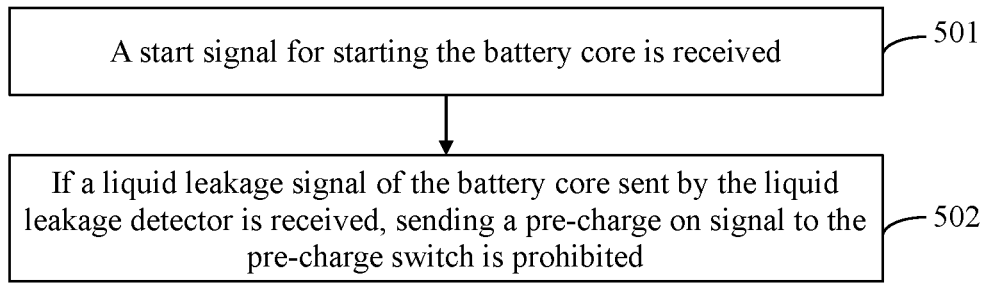
FIG. 5 is a flowchart of steps of a method for controlling a battery pack according to an example embodiment.

FIG. 5 is a flowchart of steps of a method for controlling a battery pack according to an example embodiment. The battery pack includes a controller, a battery core, a liquid leakage detector, and a pre-charge switch. The liquid leakage detector is connected with the controller. The controller is connected with the pre-charge switch. One end of the pre-charge switch is connected with a pre-charge voltage end of the battery core, and another end of the pre-charge switch is connected with a power output end of the battery pack. As shown in FIG. 5, the method may be applied to the controller and may include the following steps.

In step 501, a start signal for starting the battery core is received.

In step 502, if a liquid leakage signal of the battery core sent by the liquid leakage detector is received, sending a pre-charge on signal to the pre-charge switch is prohibited.

The pre-charge on signal is used for causing the pre-charge switch to prohibit connection of the pre-charge voltage end of the battery core and the power output end of the battery pack when not receiving the pre-charge on signal, to prohibit the battery core from outputting a pre-charge voltage through the power output end.

Optionally, the method may further include: sending the pre-charge on signal to the pre-charge switch if not receiving the liquid leakage signal.

The pre-charge on signal is used for connecting the pre-charge switch to the pre-charge voltage end and the power output end, causing the battery core to output the pre-charge voltage.

Optionally, the battery pack further includes an operation switch, where one end of the operation switch is connected with an operating voltage end of the battery core, and another end of the operation switch is connected with the power output end; and the method may further include:

prohibiting sending an operation on signal to the operation switch upon receiving the liquid leakage signal while receiving a pre-charge completion signal, and the operation switch prohibits connection of the operating voltage end of the battery core and the power output end when not receiving the operation on signal, to prohibit the battery core from outputting the operating voltage through the power output end, where the pre-charge completion signal is used for causing the battery core to stop outputting the pre-charge voltage and output the operating voltage.

Optionally, the method may further include: sending an operation off signal to the operation switch upon receiving the liquid leakage signal when operation stop permission is granted, where the operation off signal is used for causing the operation switch to disconnect the operating voltage end from the power output end, to prohibit the battery core from outputting the operating voltage.

In one embodiment, the method for controlling a battery pack may be executed by the controller shown in FIG. 1. For a specific implementation process of the method for controlling a battery pack, reference may be made to the above-mentioned embodiment, and details are not repeated herein.

Accordingly, in one embodiment, the battery pack includes a controller, a battery core, a liquid leakage detector, and a pre-charge switch. The liquid leakage detector is connected with the controller, and the liquid leakage detector is configured to send a liquid leakage signal to the controller when detecting that liquid leakage occurs in the battery core. The controller is configured to prohibit sending a pre-charge on signal to the pre-charge switch upon receiving the liquid leakage signal while receiving a start signal for starting the battery core. The pre-charge switch is configured to prohibit connection of the pre-charge voltage end and the power output end when not receiving the pre-charge on signal, to prohibit the battery core from outputting a pre-charge voltage through the power output end. In a power-on start-up stage, upon receiving the liquid leakage signal, the controller may control the battery core not to output the pre-charge voltage, to prevent the battery pack from being started in a liquid leakage state, thereby effectively protecting the battery pack.

An embodiment of the present disclosure also provides a readable storage medium. The readable storage medium stores a program or instructions. When executed by a processor, the program or instructions implement the processes in the method for controlling a battery pack, to achieve the same technical effect as that achieved by the method. In order to avoid repetition, details are not repeated in here.

An embodiment of the present disclosure also provides a chip. The chip includes a processor and a communication interface. The communication interface is coupled with the processor. The processor is configured to run the program or instructions to implement the processes in the method for controlling a battery pack, to achieve the same technical effect as that achieved by the method. In order to avoid repetition, details are not repeated in here.

It should be noted that in the present disclosure, the terms "comprise", "include" or any other variants are intended to encompass non-exclusive inclusion, such that a process, a method, an article or an apparatus including a series of elements not only include those elements, but also includes other elements not listed explicitly or includes intrinsic elements for the process, the method, the article, or the apparatus. Without any further limitation, an element defined by the phrase "comprising one" does not exclude existence of other same elements in the process, the method, the article, or the apparatus that includes the elements. In addition, it should be pointed out that, the scope of the methods and apparatus in the embodiments of the present disclosure is not limited to performing functions in the order shown or discussed, and may also include performing the functions in a substantially simultaneous manner or in reverse order depending on the functions involved, for example, the described method may be performed in a different order than that described, and various steps may also be added, omitted, or combined. In addition, features described with reference to some examples may be combined in other examples.

Although the embodiments of the present disclosure have been described above in conjunction with the accompanying drawings, the present disclosure is not limited to the specific embodiments described above, and the specific embodiments described above are merely illustrative and not restrictive. Those having ordinary skill in the art can make various changes and modifications based on the teachings of the present disclosure without departing from the spirit of the present disclosure and the scope of the appended claims. Such changes and modifications also fall within the protection scope of the present disclosure.

What is claimed is:

1. A battery pack, comprising:
   a controller, a battery core, a liquid leakage detector, and a pre-charge switch, wherein
   the liquid leakage detector is connected with the controller, and the liquid leakage detector is configured to send a liquid leakage signal to the controller when detecting that liquid leakage occurs in the battery core;
   the controller is connected with the pre-charge switch, and the controller is configured to prohibit sending a pre-charge on signal to the pre-charge switch upon receiving the liquid leakage signal while receiving a start signal for starting the battery core;
   one end of the pre-charge switch is connected with a pre-charge voltage end of the battery core, and another end of the pre-charge switch is connected with a power output end of the battery pack; and the pre-charge switch is configured to prohibit connection of the pre-charge voltage end and the power output end when not receiving the pre-charge on signal, to prohibit the battery core from outputting a pre-charge voltage through the power output end.

2. The battery pack according to claim 1, wherein
   the controller is further configured to send the pre-charge on signal to the pre-charge switch if not receiving the liquid leakage signal while receiving the start signal; and
   the pre-charge switch is further configured to connect the pre-charge voltage end and the power output end when receiving the pre-charge on signal, causing the battery core to output the pre-charge voltage.

3. The battery pack according to claim 1, further comprising an operation switch, wherein one end of the operation switch is connected with an operating voltage end of the battery core, and another end of the operation switch is connected with the power output end;
   the controller is further configured to prohibit sending an operation on signal to the operation switch upon receiving the liquid leakage signal while receiving a pre-charge completion signal; the pre-charge completion signal is used for causing the battery core to stop outputting the pre-charge voltage and output the operating voltage; and
   the operation switch is configured to prohibit connection of the operating voltage end and the power output end when not receiving the operation on signal, to prohibit the battery core from outputting the operating voltage through the power output end.

4. The battery pack according to claim 3, wherein
   the controller is further configured to send an operation off signal to the operation switch upon receiving the liquid leakage signal when operation stop permission is granted; and
   the operation switch is further configured to disconnect the operating voltage end from the power output end when receiving the operation off signal, to prohibit the battery core from outputting the operating voltage.

5. The battery pack according to claim 1, further comprising a power supply, wherein the power supply is connected with the controller and is configured to provide an independent power supply for the controller.

6. The battery pack according to claim 1, the liquid leakage detector comprises a liquid leakage detection strip, wherein the liquid leakage detection strip comprises a signal output wire and a signal input wire; one end of the signal output wire is connected with the controller, and another end of the signal output wire is unconnected; one end of the signal input wire is connected with the controller, and another end of the signal input wire is unconnected;
   the signal output wire is configured to connect to the signal input wire when liquid leakage occurs in the battery core, to transmit a detection signal sent by the controller to the signal input wire; the signal input wire is configured to transmit the detection signal as the liquid leakage signal to the controller when receiving the detection signal; and
   the signal output wire is further configured to disconnect from the signal input wire when no liquid leakage occurs in the battery core, to prohibit the signal input wire from transmitting the detection signal to the controller as the liquid leakage signal.

7. The battery pack according to claim 1, further comprising an anti-explosion valve, and the liquid leakage detector is arranged at a detection position of the anti-explosion valve.

8. A method for controlling a battery pack, wherein the battery pack comprises a controller, a battery core, a liquid leakage detector, and a pre-charge switch, the liquid leakage detector is connected with the controller, the controller is connected with the pre-charge switch, one end of the pre-charge switch is connected with a pre-charge voltage end of the battery core, and another end of the pre-charge switch is connected with a power output end of the battery pack, the method comprising:

receiving a start signal for starting the battery core; and if a liquid leakage signal of the battery core sent by the liquid leakage detector is received, prohibiting sending a pre-charge on signal to the pre-charge switch, and when not receiving the pre-charge on signal, the pre-charge switch prohibits connection of the pre-charge voltage end of the battery core and the power output end of the battery pack, to prohibit the battery core from outputting a pre-charge voltage through the power output end.

9. The control method according to claim 8, further comprising:

sending the pre-charge on signal to the pre-charge switch if not receiving the liquid leakage signal, wherein the pre-charge on signal is used for connecting the pre-charge switch to the pre-charge voltage end and the power output end, causing the battery core to output the pre-charge voltage.

10. The control method according to claim 8, wherein the battery pack further comprises an operation switch, wherein one end of the operation switch is connected with an operating voltage end of the battery core, and another end of the operation switch is connected with the power output end; and the method further comprises:

prohibiting sending an operation on signal to the operation switch upon receiving the liquid leakage signal while receiving a pre-charge completion signal, causing the operation switch to prohibit connection of the operating voltage end of the battery core and the power output end when no receiving the operation on signal, to prohibit the battery core from outputting the operating voltage through the power output end, wherein the pre-charge completion signal is used for causing the battery core to stop outputting the pre-charge voltage and output the operating voltage.

11. The control method according to claim 10, further comprising:

sending an operation off signal to the operation switch upon receiving the liquid leakage signal when operation stop permission is granted, wherein the operation off signal is used for causing the operation switch to disconnect the operating voltage end from the power output end, to prohibit the battery core from outputting the operating voltage.

12. A vehicle, comprising the battery pack according to claim 1.

* * * * *